(12) United States Patent
Schrank et al.

(10) Patent No.: US 11,008,160 B2
(45) Date of Patent: May 18, 2021

(54) EXCAVATION RECEPTACLE/BEDDING BOX

(71) Applicant: PIPE BEDDING SOLUTIONS LLC, Gillette, WY (US)

(72) Inventors: Reggie L. Schrank, Gillette, WY (US); Riley Schrank, Gillette, WY (US)

(73) Assignee: PIPE BEDDING SOLUTIONS LLC, Gillette, WY (US)

( * ) Notice: Subject to any disclaimer, the term of this patent is extended or adjusted under 35 U.S.C. 154(b) by 116 days.

(21) Appl. No.: 16/356,873

(22) Filed: Mar. 18, 2019

(65) Prior Publication Data
US 2020/0299058 A1  Sep. 24, 2020

(51) Int. Cl.
*B65D 88/12* (2006.01)
*B65D 90/00* (2006.01)
*B65G 65/23* (2006.01)

(52) U.S. Cl.
CPC ....... *B65D 90/0033* (2013.01); *B65D 88/123* (2013.01); *B65G 65/23* (2013.01)

(58) Field of Classification Search
CPC .... B65D 88/12; B65D 88/121; B65D 88/122; B65D 88/123; B65D 88/127; B65D 88/128; B65D 88/129; B65D 90/00; B65D 90/0026; B65D 90/0033; B65D 25/28; B65D 51/24; B65D 51/242; B65G 65/23; B66C 1/663; B60P 1/6418
USPC ..... 220/1.5, 628, 646, 647, 669–673, 212.5, 220/752, 755; 414/800, 810
See application file for complete search history.

(56) References Cited

U.S. PATENT DOCUMENTS

| | | | | |
|---|---|---|---|---|
| 18,540 A | * | 11/1857 | Focht | B65F 1/122 294/68.26 |
| 1,924,143 A | * | 8/1933 | Williamson | B65D 88/12 294/68.2 |
| 3,440,744 A | * | 4/1969 | Smith | E02F 3/962 37/404 |
| 3,596,764 A | * | 8/1971 | Smith | B07B 1/46 209/421 |
| 3,664,137 A | * | 5/1972 | Lett | E02F 5/10 405/50 |
| 4,172,687 A | * | 10/1979 | Schultz | E02F 3/962 37/403 |
| 4,195,744 A | * | 4/1980 | Christianson | B65D 88/10 206/386 |
| 4,462,715 A | * | 7/1984 | Ashbaugh | E02F 5/223 405/157 |
| 4,805,703 A | * | 2/1989 | Carlsson | E02F 7/06 171/132 |

(Continued)

FOREIGN PATENT DOCUMENTS

DE  3822361 A1 * 1/1989 ........... B65D 88/542

*Primary Examiner* — Joshua E Rodden
(74) *Attorney, Agent, or Firm* — David R. Heckadon; Gordon Rees Scully Mansukhani LLP

(57) ABSTRACT

An industrial sized receptacle or bedding box for industrial fill material which is formed by a distal plate, a proximal plate, two side plates, and a bottom plate. The bedding box is equipped with a means for engagement by a secondary device, such as the bucket of an excavator or similar heavy machinery. The bedding box can then be manipulated by the secondary device to lift and tilt the bedding box to empty the contents of the bedding box through an opening in the proximal plate.

8 Claims, 2 Drawing Sheets

(56) References Cited

U.S. PATENT DOCUMENTS

| | | | | |
|---|---|---|---|---|
| 5,367,796 | A * | 11/1994 | Bowers | E02F 3/4075 37/410 |
| 7,473,068 | B2 * | 1/2009 | Berentsen | E02F 7/04 294/68.26 |
| 7,520,707 | B1 * | 4/2009 | Ness | B65D 88/123 410/31 |
| 8,789,722 | B2 * | 7/2014 | Reuthe | B65D 88/128 220/628 |
| 9,701,466 | B1 * | 7/2017 | Horton | B65D 90/18 |
| 10,940,507 | B2 * | 3/2021 | McLaughlin | B07B 1/34 |
| 2004/0169038 | A1 * | 9/2004 | Pickler | B60P 1/50 220/1.5 |
| 2009/0167039 | A1 * | 7/2009 | Estes | B65D 90/0033 294/68.1 |
| 2010/0012667 | A1 * | 1/2010 | Powell | B65D 90/18 220/628 |
| 2013/0341332 | A1 * | 12/2013 | Reuthe | B65D 88/128 220/562 |
| 2015/0086309 | A1 * | 3/2015 | Krawchuk | E21B 41/005 414/332 |

* cited by examiner

EXCAVATION RECEPTACLE/BEDDING BOX

FIELD OF THE INVENTION

The present invention relates to a bedding box that can be employed to hold stone or similar fill material at a construction site, and particularly for a bedding box suitable for use at sites with limited space.

BACKGROUND OF THE INVENTION

Excavators are used to move material during excavation and construction projects. Often, the material moved by the excavator must be removed from a particular area of a site using a material container or bedding boxes. Such material containers can be difficult to move and to empty.

Bedding boxes are employed as on-site storage containers for holding stone and other materials used in the course of bedding, grading, and related tasks at a construction site. Bedding boxes are large, massive boxes that frequently have a frame to add strength and rigidity and terminate in an end frame that is configured to provide a passage into which the bucket of an excavator can be wedged. When the bucket of an excavator is so wedged in the opening, the boom of the excavator can be raised, and the bedding box is lifted by the bucket, and can then be moved around the site.

One of the difficulties of the currently available bedding boxes is that the engagement of the bedding box with the bucket of the excavator does not permit the excavator operator to position the bedding box over the dump site and pour the contents of the bedding box accurately and without spillage into the surrounding areas. Instead, the contents of the bedding boxes must be removed by scooping its contents out with an excavator and then dumping the contents onto the fill site with the bucket of the excavator.

The present invention allows an excavator bucket to securely lift the bedding box and position it directly above the intended dumping location. The operator of the excavator may then manipulate the excavator boom and bucket to tilt the bedding box to pour the contents of the bedding box directly and accurately into the intended dump location. This innovation bypasses the long and tedious task of removing individual bucket loads of fill material with the excavator.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

REFERENCE NUMERALS

Figure 1:
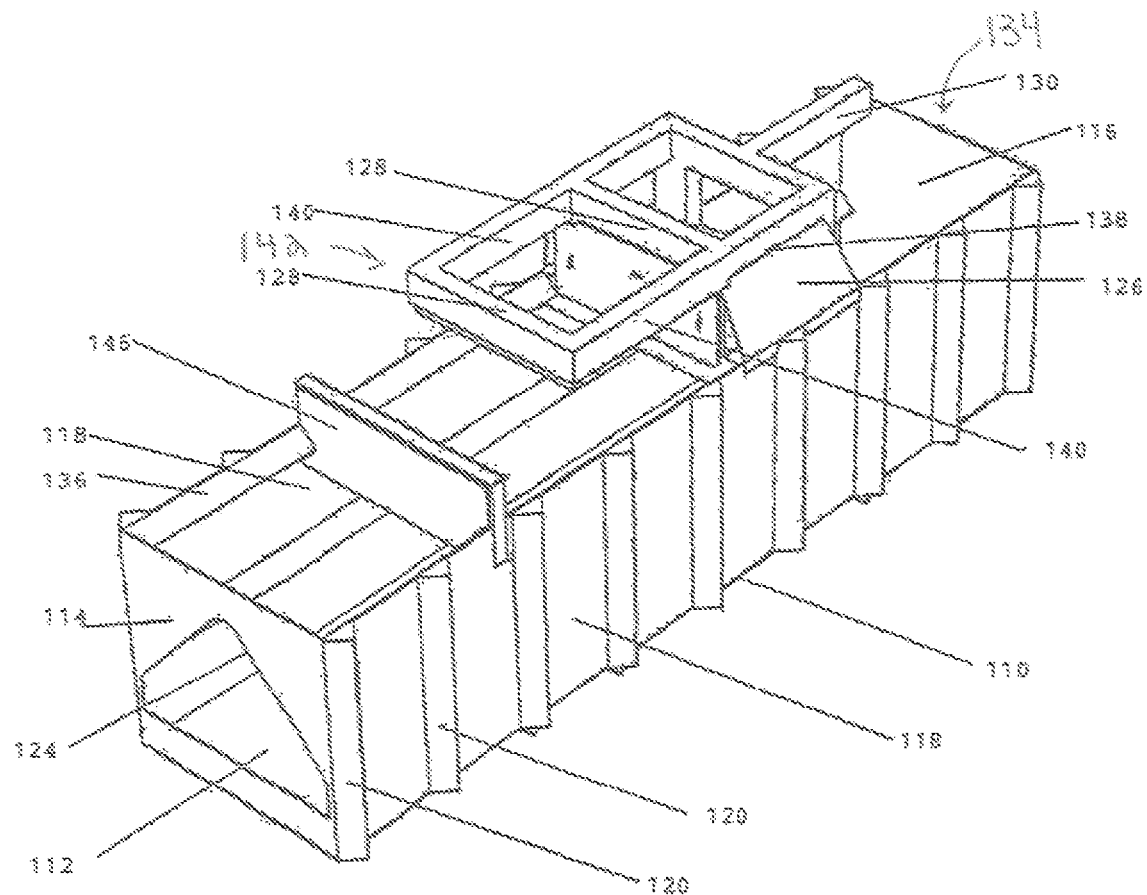
FIG. 1 is a perspective view of the present invention.
Figure 2:
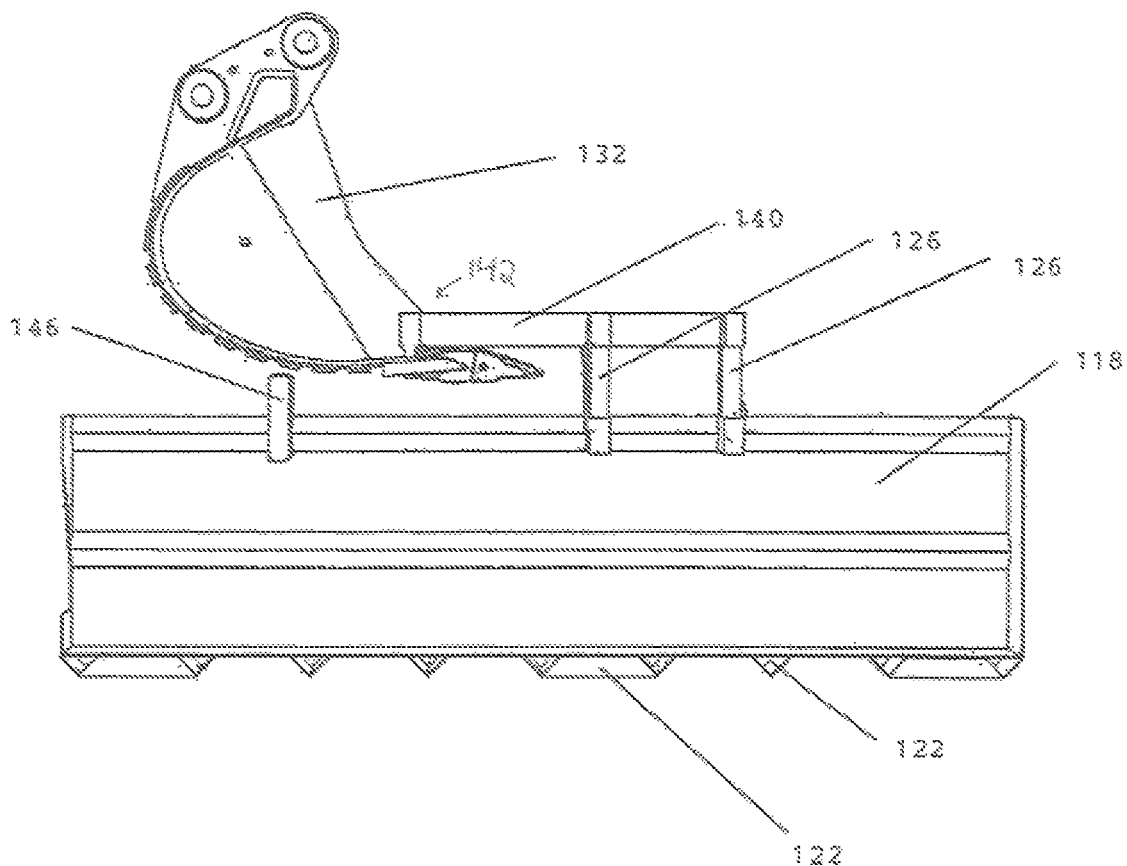
FIG. 2 is a side view of the present invention showing the bucket of an excavator in a coupled position.

Bedding Box 110
Bottom Plate 112
Proximal Plate 114
Distal Plate 116
Side Plates 118
Vertical Braces 120
Skids 122
Proximal Plate Opening 124
Upright support Members 126
Horizontal Member 128
Cantilever Member 130
Excavator Bucket 132
Container 134
Container Upper Rim 136
Upright support member free ends 138
Lateral lifting members 140
Lateral Lifting Member Free Ends 142
Horizontal Lifting Member 144
Reinforcing Bar 146

SUMMARY OF INVENTION

The present invention is for a bedding box for storing soil or other construction fill material at a construction site or excavation project. The box may be filled with the desired fill material and then poured or dumped from the bedding box when the bucket of an excavator is used to engage a horizontal member to lift and tilt the box above the desired dumping location.

The bedding box has a container terminating in a distal end plate and a proximal end plate. The container is further founded by side plates and a bottom plate. The distal end plate, the proximal end plate, and the side plates terminate in a container upper rim. The proximal plate and distal plate may be sloped to allow for easy access to the bedding box, however in the shown preferred embodiment, said proximal plate and distal plate are essentially vertical. Drain holes may be provided through the bottom plate to allow for the drainage of water, however, such drain holes are not present in the preferred embodiment of the invention. Vertical braces are positioned equidistantly along said side plates to increase the rigidity of the container, stiffen the sidewalls, and reduce buckling.

A Upright support Member is affixed equidistantly to the upper rim of both side plates. The upright support members are connected to a horizontal Member that extends horizontally and is positioned at the container upper rim. The upright support members terminate in upright free ends, and a second Horizontal Member is affixed to the upright support member free ends, extending parallel to the first horizontal member, the distal plate, and the proximal plate. The region between the two horizontal members is sufficient to allow for the end of an excavator bucket to fit between them.

A lateral lifting member is affixed to each of the Upright support Member Free End and extend proximally parallel to the Container upper rim. The lateral lifting members terminate at free ends at a distance sufficient for the excavator bucket to fit underneath and engage the inferior side of the lateral lifting members. The lateral lifting member free ends are connected by a horizontal lifting member parallel to the container upper rim and is affixed at one end to right lateral lifting member free end and at the other end to the left lateral lifting member. The underside of the horizontal lifting member is shaped to mate with the excavator bucket when engaged by the excavator bucket.

When an excavator bucket is engaged to the horizontal lifting member, it allows the box to be lifted from one end by an excavator bucket in a manner similar to that of a large conventional bedding box, allowing the excavator to reposition the box at the site while the excavator remains stationary or to lift the bedding box and tilt it over the intended dump site to directly pour the contents of the box as desired.

The bedding box is also provided with at least two skids residing below the bottom plate and substantially spanning the distance between the proximal end plate and the distal end plate. These skids serve two functions; first, they allow easier movement over the terrain on which the bedding box resides, and second, they enhance the rigidity of the bottom plate thereby further strengthening the bedding box.

DETAILED DESCRIPTION OF THE PREFERRED EMBODIMENTS

Referring to FIG. 1, a preferred embodiment is shown of the instant invention, a bedding box 110. The bedding box 110 is designed for use with excavators which typically are equipped with a Bucket 132 mounted to a boom (not shown). The bedding box 110 is designed to hold soil, bedding fill or other industrial fill material, which can be removed from the bedding box 110 by tilting the bedding box 110 and dropping the soil, bedding fill or other industrial fill material at the desired position.

The bedding box 110 has a container 134 which terminates in a distal end plate 116 and a proximal end plate 114. The container 134 is further bounded by side plates 118 and a bottom plate 112. The distal end plate 116, the proximal end plate 114, and the side plates 118 terminate in a container upper rim 136 defined by the top edges of these plates (114, 116, 118).

The preferred embodiment of the bedding box 110 is constructed with an opening 124 in the proximal plate 114 of sufficient size for the fill material contained within the bedding box 110 to be poured through when the bedding box 110 is tilted by raising the distal end of the bedding box 110 relative to the proximal end when the bedding box 110. In the present embodiment, the proximal plate opening 124 is generally centrally placed in the proximal plate 114 in order to allow for greater control when the contents of the bedding box 110 are poured over a dumping location. It is recommended that the proximal plate opening 124 does not meet the distal plate 112 to allow for a greater volume of fill material to be loaded into the bedding box 110 without any unwanted spillage through the proximal plate opening 124. In the present invention, the proximal plate opening 124 is substantially triangular in shape with a wider opening near the inferior edge of the proximal plate 114 which narrows gradually toward the superior edge of the proximal plate 114. This substantially triangular shape allows the user to exercise greater control and precision in the volume and placement of fill material poured from the bedding box 110.

Along the length of the side plates 118, a plurality of vertical braces 120 are affixed vertically equidistantly along the length of the side plates 118 and extend therealong between the superior edge and inferior edge of the side plates 118 to enhance the rigidity of both the side plates 118 and provide direct support against buckling of the side plates 118.

To insure sufficient rigidity of the container 134, it is preferred that the plates (112, 114, 116, 118) be fabricated from steel, and to maintain a reasonably low weight while maintaining strength and structural integrity, the steel should be approximately ¼ to ½ inch thick.

The container upper rim 136 has at least one pair of upright support members 126 terminating in a pair of upright support member free ends 138, wherein one upright support member 126 is positioned at the superior edge of one side plate 118 and the other upright support member 126 is positioned at the superior edge of the opposite side plate 118. The pair of upright support members 126 are connected by a horizontal member 128 which is affixed at either end to the upright support member free ends 138 so that the horizontal member 128 extends horizontally and perpendicularly from the side plates 118 and parallel to the proximal plate 114 and the distal plate 116. It is recommended that the upright support members 126 be positioned on the container upper rim 136 at or near the center of the side plates 118 to ensure that the bedding box 110 is balanced when lifted above the ground. In the present embodiment of the invention, an additional pair of upright support members 126 are affixed to the container upper rim 136 with each upright support member 126 being connected to the container upper rim 136 at positions between the first upright support member 126 and the distal plate 116, and which second pair of upright support members 126 are connected by a horizontal member 128, as described above, which is further parallel to the horizontal member 128 connecting the first pair of upright support members 126. The length of the upright support members 126 must be of sufficient length so that the open area is of sufficient size for an excavator bucket 132 to fit between the container upper rim 136 and the bottom of the most anterior horizontal member 128.

A lateral lifting member 140 is affixed to each of the upright support member free end 138 and extend proximally parallel to the side plates 118 for at least the length of an excavator bucket 132. The lateral lifting members 140 terminate at free ends 142. The lateral lifting member free ends 142 are connected by a horizontal member 128 which extends horizontally and perpendicularly from the side plates 118 and parallel to the proximal plate 114 and the distal plate 116. The underside of the most proximal horizontal lifting member 144 which is affixed to the lateral support member free ends 142 is shaped to mate with the open face of an excavator bucket 132 when engaged by the excavator bucket 132.

A reinforcing bar 146 is affixed to the upper rim is affixed to the container upper rim 136 with each end of the reinforcing bar 146 being connected to the container upper rim 136 at positions along the upper edge of each side plate 118 at positions proximal to the proximal most horizontal member 128, so that the reinforcing bar 146 is parallel to the proximal plate 114 and the distal plate 116 and is perpendicular to the side plates 118. The reinforcing bar 146 should be positioned at a sufficient distance from the proximal most horizontal member 128 so as to allow the excavator bucket to be wedged between the reinforcing bar 146 and the proximal most horizontal member 128 when the excavator bucket 132 is in coupled position relative to the proximal most horizontal member 128. When so engaged, the reinforcing bar 146 can be considered as a fulcrum, with the weight of the bedding box 110 creating a torque about the line of engagement between the excavator bucket 132 and the reinforcing bar. This torque forces the proximal most horizontal member 128 against the excavator bucket 132, which blocks rotation of the bedding box 110 and results in frictional forces between the excavator bucket 132 and the reinforcing bar 146 and the proximal most horizontal member 128 to maintain the bedding box 110 engaged with the excavator bucket 132 and allowing it to be lifted by the excavator to be repositioned by moving the excavator bucket 132 to the desired new position for the bedding box 110 and allows the excavator bucket 132 to lift the bedding box 110 and to tilt the bedding box 110 by pivoting the excavator bucket 132 relative to the excavator boom.

A cantilever member 130 is affixed perpendicularly at one end to the distal face of the distal most horizontal member 128 and extends distally therefrom so that it extends parallel to the side plates 118 and the lateral support members 140. The length of the cantilever member 130 is sufficient so as to provide the ability for the operator and an excavator to reposition the bedding box 110 to a more desirable location or facing by using the excavator bucket 132 and excavator boom to push or pull on the cantilever member 130.

In the present embodiment of the invention, at least two skids 122 are affixed to the bottom plate 112, and extend therealong between the side plates 118. It is also possible that the skids 122 could also be affixed to the bottom plate 112 and extend therelong between the proximal plate 114 and the distal plate 116. These skids 122 serve two functions; first, they allow easier movement over the terrain on which the bedding box resides, and second, they enhance the rigidity of the bottom plate thereby further strengthening the bedding box 110.

We claim:

1. A bedding box for storing soil, stone or other construction material, the bedding box comprising:
    a container terminating in a distal end plate and a proximal end plate, said container being further bounded by side plates and a bottom plate, said distal end plate, said proximal end plate, and said side plates terminating at a container upper rim;
    a substantially horizontal member affixed at one end at or near said upper rim on one said side plate and at another end at or near said upper rim on another said side plate;
    a lateral lifting member extending proximally from said horizontal member, the lateral lifting member being shaped for an excavator bucket to grip or attach at or near a proximal end of the lateral lifting member; and
    a cantilever member extending from the horizontal member towards the distal plate.

2. The bedding box of claim 1 which further comprises two or more substantially upright support members wherein one said upright support member is affixed substantially vertically at one end to said upper rim of the one of said side plates and another said upright support member is affixed substantially vertically at one end to said upper rim of the another said side plate.

3. The bedding box of claim 2 wherein said horizontal member is affixed at the one end at or near a superior end of one said upright support member and at the an other end at or near the superior end of the another said upright support member.

4. The bedding box of claim 1, further comprising: a reinforcing bar positioned to mate with the bucket of an excavator.

5. A bedding box according to claim 4, wherein the reinforcing bar is arranged so that the said bedding box can be pushed, raised, or tilted by the excavator when the excavator's bucket is in contact with the reinforcing bar.

6. The bedding box of claim 1 wherein said proximal plate further comprises a hole of sufficient size for the contents of said bedding box being to fall through when the distal portion of said bedding box is raised relative to the proximal portion of said bedding box.

7. The bedding box of claim 1 further comprising:
    a plurality of skids residing below said bottom plate and substantially spanning between said distal end plate and said proximal end plate.

8. The bedding box of claim 1 further comprising a plurality of vertical struts affixed substantially vertically along said side plates.

* * * * *